Jan. 21, 1936. A. G. DECKER 2,028,441
CLUTCH RELEASE FOR PORTABLE ELECTRIC WRENCHES
Filed July 14, 1932 6 Sheets-Sheet 2

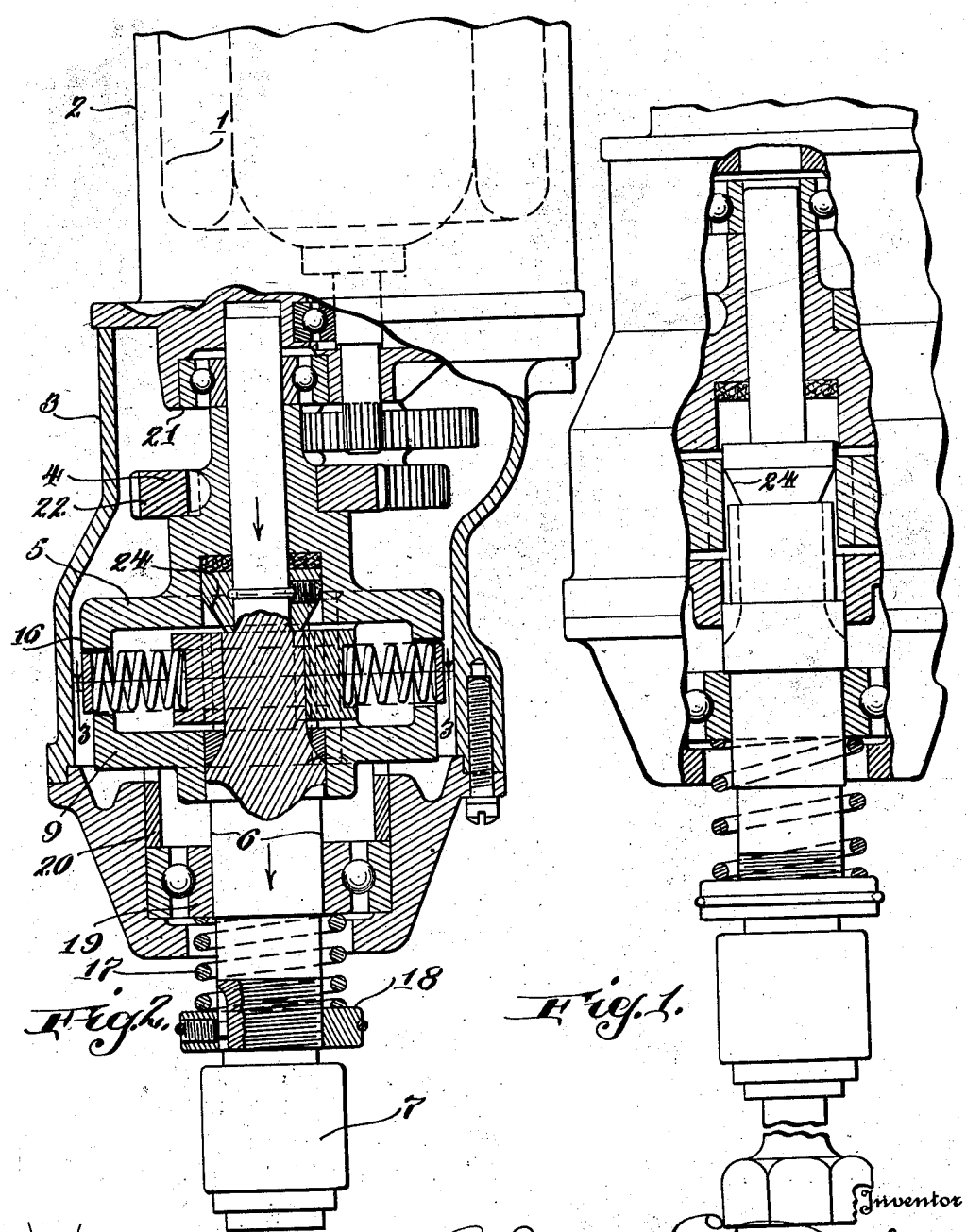

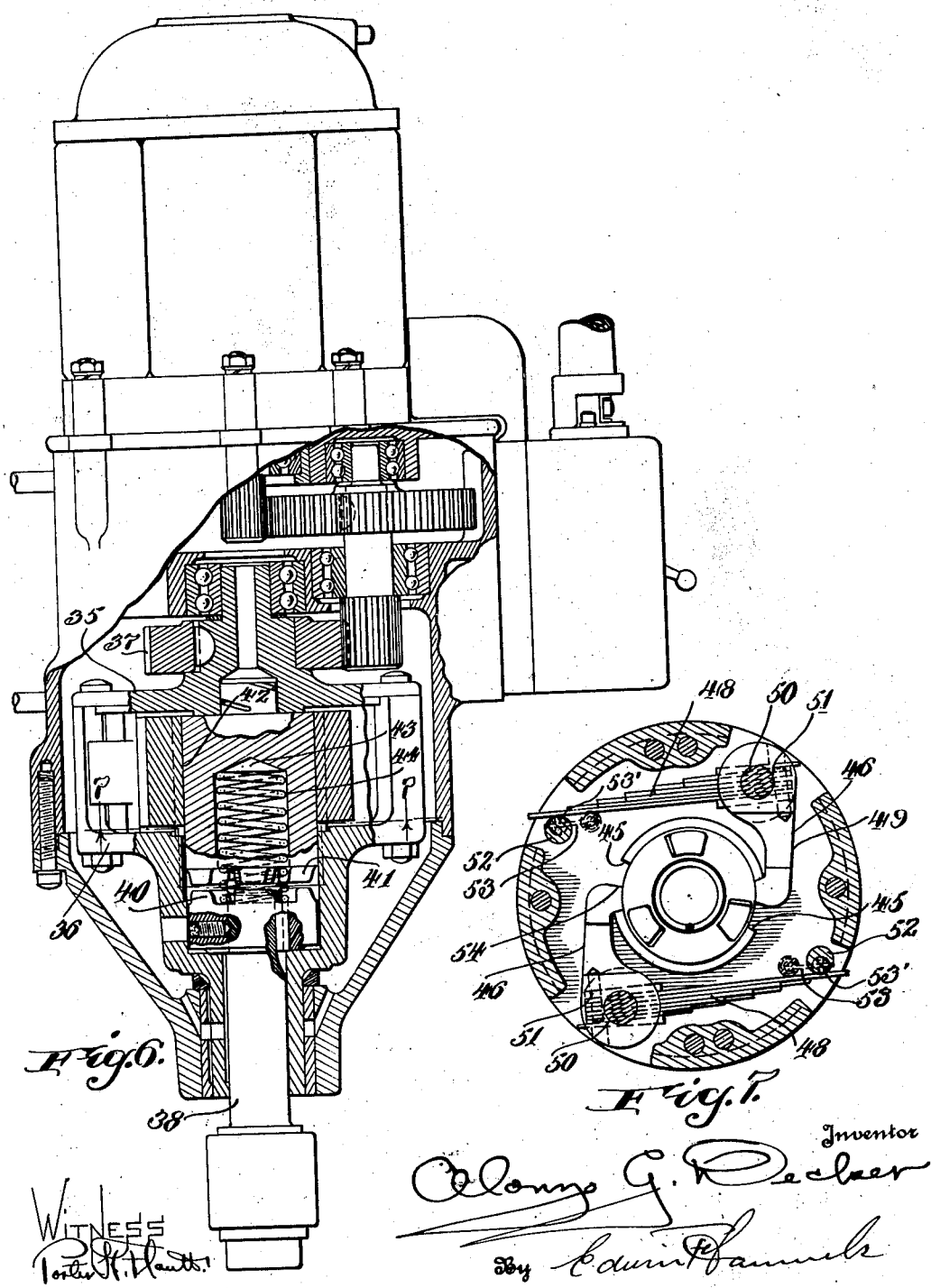

Jan. 21, 1936.    A. G. DECKER    2,028,441
CLUTCH RELEASE FOR PORTABLE ELECTRIC WRENCHES
Filed July 14, 1932    6 Sheets-Sheet 4

Inventor
Alonzo G. Decker
By Edwin Hammuck
Attorney

Witness
Porter K. Heutt

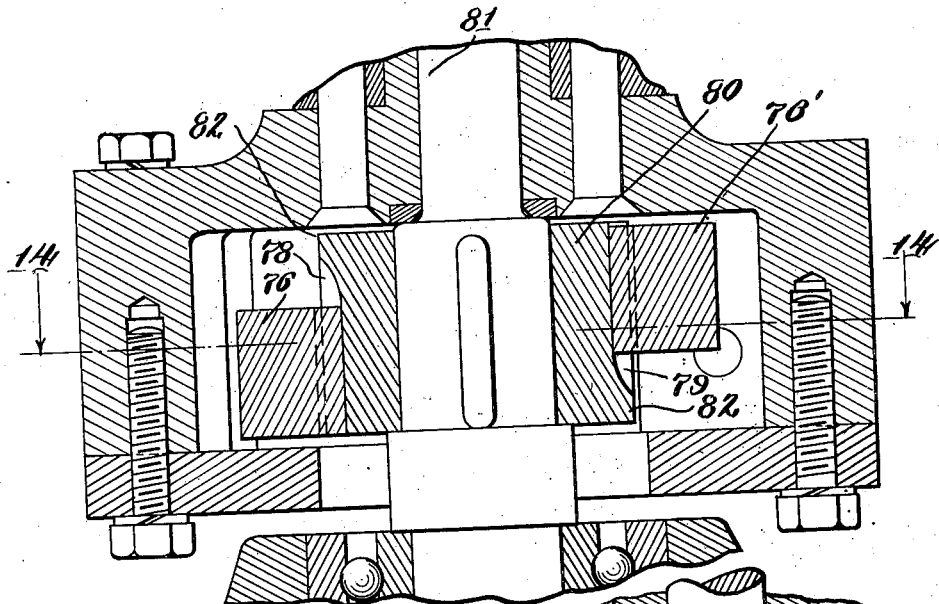
Fig. 12.
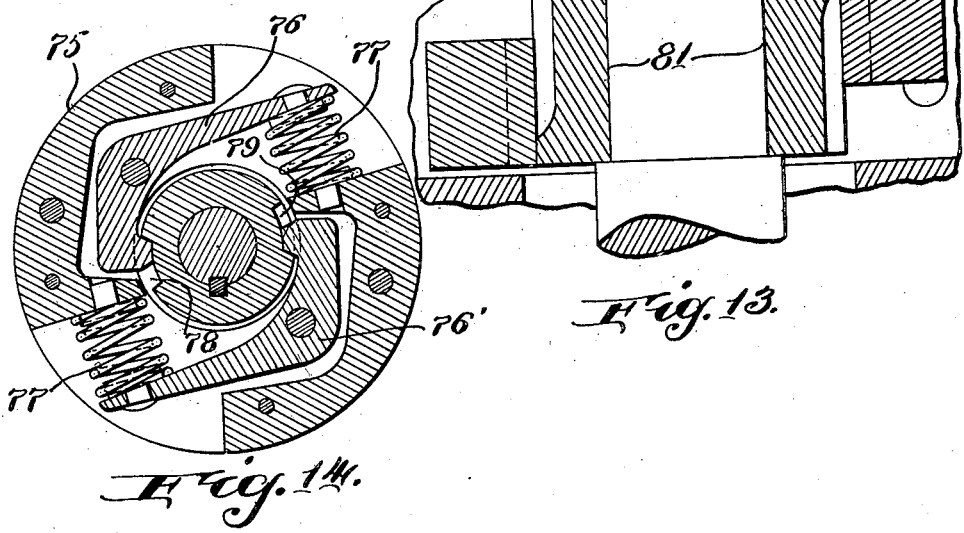
Fig. 13.
Fig. 14.

Jan. 21, 1936. A. G. DECKER 2,028,441
CLUTCH RELEASE FOR PORTABLE ELECTRIC WRENCHES
Filed July 14, 1932 6 Sheets-Sheet 6
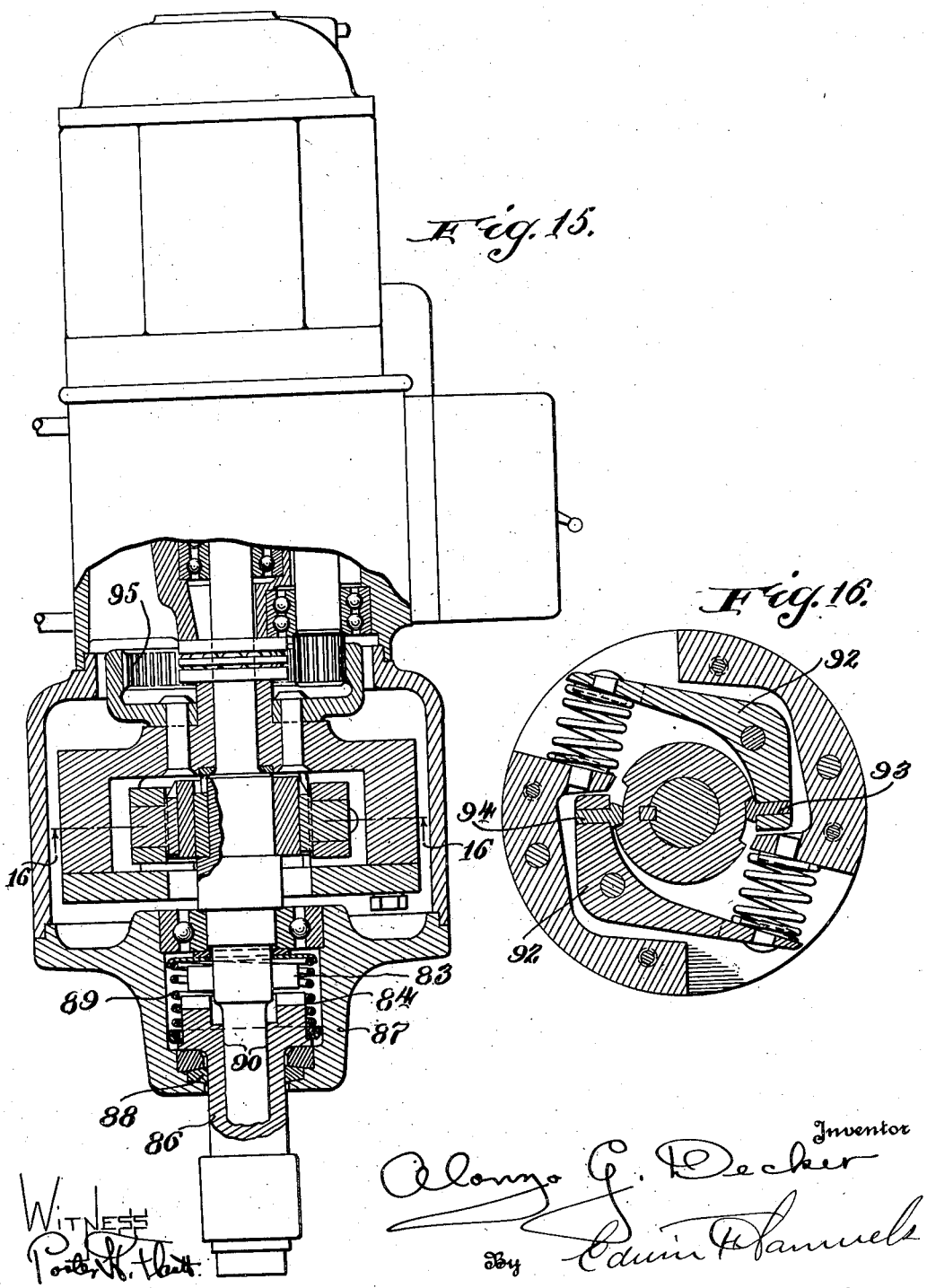

Patented Jan. 21, 1936

2,028,441

UNITED STATES PATENT OFFICE 2,028,441

CLUTCH RELEASE FOR PORTABLE ELECTRIC WRENCHES

Alonzo G. Decker, Baltimore, Md., assignor to The Black & Decker Manufacturing Company, a corporation of Maryland Application July 14, 1932, Serial No. 622,444

11 Claims. (Cl. 81—54)

In nut running and setting and in the driving of bolts and lag screws by means of the manually portable power driven hand controlled machines which are now in general use, it is essential that the nuts, bolts and screws be set with a high degree of tension and at the same time that the driving torque of the tool be released at a predetermined point or stress to prevent straining and resulting breakage of the parts. Setting of the nuts, bolts, etc. is best accomplished by a device which will release and take hold at intervals, utilizing the momentum of the parts to apply repeated impulses to the work, at the same time protecting the shafts, keys, gears, etc. from harmful stresses. These repeated impulses to make the tool applicable to both the setting and removal or unsetting of nuts, bolts, etc., must be applied in either the setting or releasing direction at the will of the operator.

The prior art contains numerous screw driving and nut running machines in which an overload release is accomplished by yielding in the direction of the axis, but this axial motion becomes a vibratory action when the screw or nut is being set by repeated application of the momentum of the parts as above described, or it is repeatedly releasing and reengaging for any reason, and this vibration of the tool results in considerable discomfort to the workman and at the end of a long period causes excessive weariness and loss of efficiency.

The invention relates to an overload release which operates at right angles to the tool spindle or transversely thereto at any convenient angle, avoiding or eliminating the objectionable vibratory motion of the body of the tool in the direction of the axis previously referred to as occurring when the momentum of the parts is utilized to effect setting or in some instances unsetting or releasing of the nut or screw or bolt upon which the tool is operated.

In the accompanying drawings I have illustrated a portable power driven bolt and nut running machine embodying a normal release and the overload release in several of the various forms in which the invention may be applied.

In the drawings:—

Figure 1 is a fragmentary elevation of a portable power driven nut running, bolt, and screw driving machine, the lower portion of the figure being broken away to include a section on the line of the axis, showing the overload releasing clutch in its normally released position.

Figure 2 is a similar view showing the parts in the position which they occupy when the tool is in engagement with the work.

Figure 6 shows a complete portable power driven nut running, bolt setting or screw driving machine in elevation, the lower portion of the casing being broken away to show the included parts in section on the line of the axis. This figure illustrates an alternative form of tool.

Figure 7 is a section through the clutch unit on the line 7, 7 in Figure 6.

Figure 12 is a fragmentary vertical axial section showing a type of overload release in which there are two opposite dogs giving a two point engagement, but these dogs are so arranged that they engage but once in a revolution.

Figure 13 is a view corresponding to Figure 12 showing the dogs or pawls released, the previous figure showing them in engagement.

Figure 14 is a section on the line 14, 14 in Figure 12.

Figure 15 is an elevation of a portable power driven tool partly in section to show the overload release, the section being on a plane of the axis.

Figure 16 is a section on the line 16, 16 in Figure 15.

Figure 3:
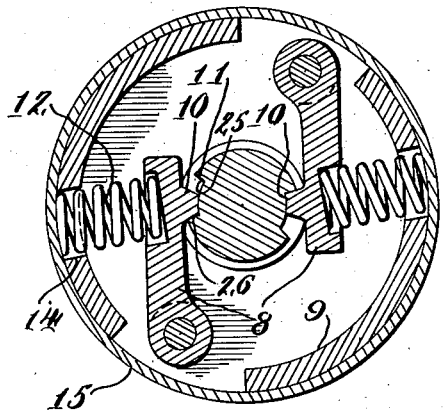
Figure 3 is a section on the line 3, 3 in Figure 2.

Referring to the drawings by numerals, each of which is used to indicate the same or similar parts in the different figures, the construction shown, having particular reference to Figures 1, 2 and 3, includes any suitable type of portable motor 1 which may be enclosed in a motor housing 2 which is connected in any suitable manner to the gear casing 3 which encloses any suitable type of reducing gear drive 4. The drawings also show clutch release unit 5 by which the rotary motion of the motor as modified by the gearing 4 is communicated to the spindle 6 which carries the tool chuck 7. This clutch release as shown particularly in Figure 3, includes pawls or dogs 8 which are pivotally mounted in and on the clutch housing 9, the pivot pins being parallel to the tool axis so that the dogs or pawls swing in a plane at right angles to the tool axis or substantially so. These dogs or pawls as shown are provided each with a tooth 10. The teeth engage corresponding oppositely disposed ratchet notches 11 in the shaft or spindle 6. The pawls are urged forwardly or inwardly in a radial direction or substantially so, into engagement with said notches 11 by means of helical springs 12 which in the form of the invention shown are mounted in holes or sockets 14 in the sides of the housing being supported and held in an operative position by a slip ring 15 which encircles the housing and slides up and down thereon being positioned by means of a shoulder 16, it being understood that any suitable arrangement of pawls and springs may be substituted for the one shown. The ring provides for easy and convenient removal and replacement of the springs.

In the form of the invention illustrated in Figures 1 to 4, the shaft or spindle 6 is mounted to slide in the direction of its length being urged downwardly by gravity which action is preferably supplemented by a helical spring 17 encircling the shaft above the tool chuck or coupling 7, being shown as confined between a collar 18 on the shaft and the shaft bearing 19 inside the casing which in the form shown is apertured to admit the end of the spring. Any suitable abutments may be utilized for this purpose.

In the form shown the clutch unit, more particularly the housing 9, is supported on the bearing 19 by a sleeve 20 which holds it in contact with the upper bearing 21 and the end gear 22 of the train 4 is mounted on an upward extension of the housing so that the rotation of the motor is communicated through the train directly to the housing which carries the pawls.

These pawls or dogs 8 are held normally out of engagement with the notches 11 in the shaft 6 by means of a wedge or cone 24 secured to the shaft 6 to slide therewith, it being understood that the cone or wedge 24 normally enters between the pawls as best shown in Figure 1. When the tool bit or wrench which is inserted in the chuck 7 or otherwise operatively connected to the tool, is pressed against the work with sufficient force to compress the spring 17 by the upward yielding of the shaft 6, the cone or wedge 24 is removed from the path of the pawls 8 permitting them to be advanced by the springs 12 into engagement with the notches 11 in the shaft 6 effecting a driving connection between the motor and the shaft through the clutch housing which is thus connected by the pawls to the shaft. When the tool is withdrawn from the work, the shaft is returned to normal position by spring 17, and the pawls are held released.

The angle of the sides 25 and 26 of the notches 11 has been found by experiment to have an important effect on the operation of the clutch release. As the result of these experiments a twenty degree angle is found to be the most satisfactory arrangement of the sides of the notch. With a less angle, the nut or screw is not seated with sufficient tension. With a steeper angle the dog or pawl is thrown further out with a sudden jerking action rather than with the smooth riding action which is desirable and which is obtained with the twenty degree angle. It has also been found that with a greater angle than twenty degrees, while the bolt is not set so tightly, the action is even smoother.

Figure 5:
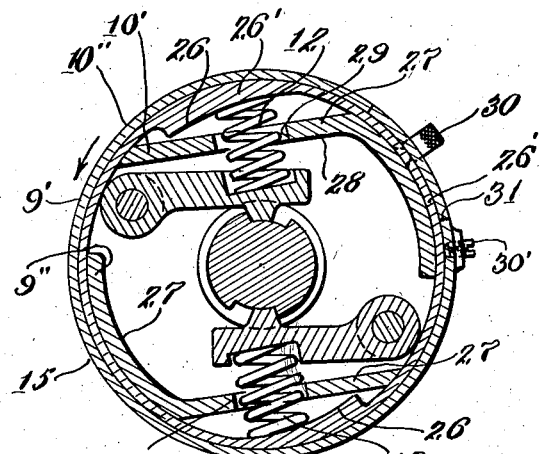
Figure 5 is a view corresponding to Figure 3 showing an adjusting device for varying the tension of the pawl or dog springs.
Figure 4:
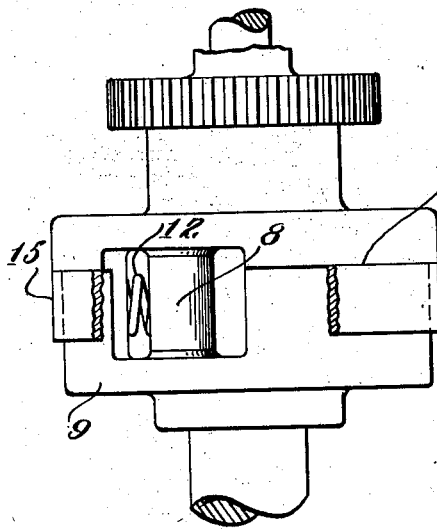
Figure 4 shows the clutch unit removed, the figure being an elevation and broken away to show the interior.
Figure 17:
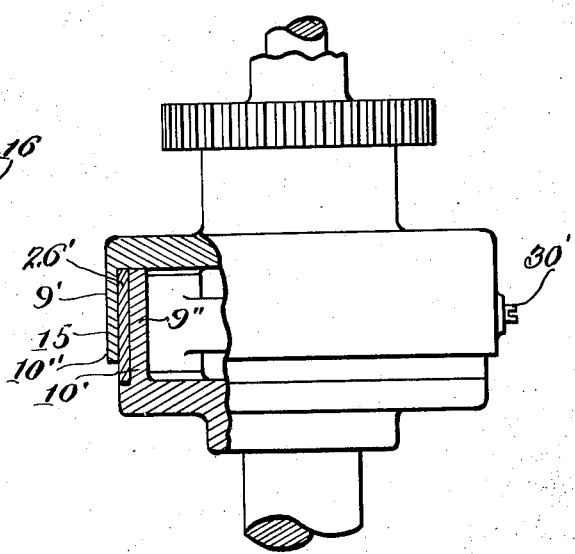
Figure 17 is an elevation of the clutch unit of Fig. 5 and is partly broken away to show the interior.

In Figures 5 and 17 I have shown a modified arrangement of the springs which actuate the pawls or dogs. In this construction the springs 12, 12 are supported upon inclined camlike surfaces 26 formed on ring 26' within the clutch casing 9', which consists of a lower section 10' and an upper section 10''. The upper section encloses and takes over the edge of the lower section. The bearing of the springs on these inclined surfaces is varied and changed, and this tension adjusted by rotation of the ring 26'. The springs are supported by brackets 27 on the lower section of the casing. These brackets have chordlike portions 28 oppositely located and apertured at 29 to receive the springs and position them. The ring 26' is rotated to adjust the springs by means of a pin 30 projecting through a slot 31 and this ring 26' is held in adjusted position by a set screw 30'.

Figure 8:
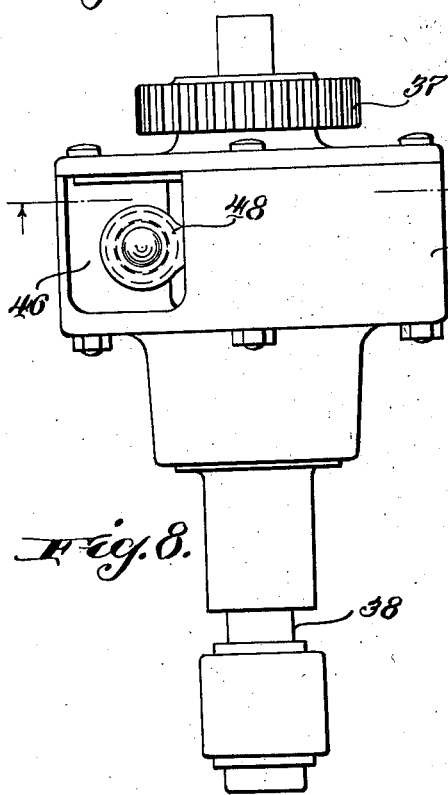
Figure 8 shows the clutch unit removed, the figure being an elevation including the spindle.

The construction shown in Figures 6 to 8 will now be described. Figure 6 shows a portable power driven manually controlled tool of the nut turning, bolt and screw driving type, including the clutch unit 35. The clutch casing or housing 36 is driven from the motor by means of a toothed gear 37 secured thereto. The tool shaft or spindle 38 may be mounted to slide in the direction of its length and be provided at its upper end with engaging means 40 to cooperate with corresponding means 41 on the lower end surface of what may be termed the hub 42 of the clutch unit. This hub 42 is chambered from below concentrically with the axis at 43 and this chamber contains a helical spring 44 which bears at one end against the end of said chamber 43 and at the other end against the upper end of the spindle or shaft 38 so that the engaging means 40, 41 are normally separated permitting the spindle 38 to be rotated freely.

Referring to Figure 7, it will be noted that this hub is notched as to its periphery at opposite points, the notches being indicated by reference character 45, and the notches are engaged by dogs or pawls 46, the tails of which 48 are at right angles or transverse to the toothed arms 49 so that the pawls may be described as of the bell crank type, the tails 48 being in the nature of cantilever leaf springs which may be secured to the arms 49 adjacent the pivots in any convenient manner, preferably they are attached to the pawl shafts 50 by screw clamps 51. The tension of these springs may be adjusted by means of eccentrics 52 which are secured in adjusted position in any suitable manner as by means of wires 53 entering a slot 53 therein.

In the operation of the tool, when the resistance offered by the work is sufficient, as the nut or bolt being driven approaches its final position, the pawls or dogs 46 are released against the spring pressure, etc. by the action of their teeth 54 against the sides of the notches 45, the pawls being again returned to engaging position by the springs 48, applying repeated impulses to the work, the impulses being due to the torque of the motor and to the momentum of the parts. These impulses are repeated so long as the tool is held in engagement with the work with sufficient pressure to hold the means 40, 41 in engagement in a manner well understood in the art. The action of the pawls 46 serves to prevent overloading and the application of undue stress to the parts.

Figure 9:
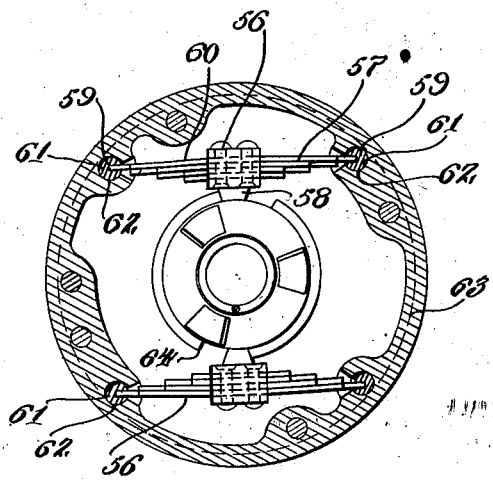
Figure 9 is a view corresponding to Figure 7 showing a different form of dog and spring, a leaf spring with a two point support being substituted for the types shown in the previous figures.

Figure 9 shows the pawls or dogs 56 formed of leaf springs 57, the teeth 58 being supported at and secured to the centers of the springs. The ends 59 of the main leaves 60 of said spring are secured to pins 61 seated in circular pockets 62 formed in the inner walls of the clutch housing or casing 63. In this way the springs 57 are permitted to flex freely to permit the pawls to be released and engaged with the notches 64. Further any tendency to whipping of the pawls or dogs due to the momentum of the pawl or dog as it is engaged and released, is eliminated.

Figure 10:
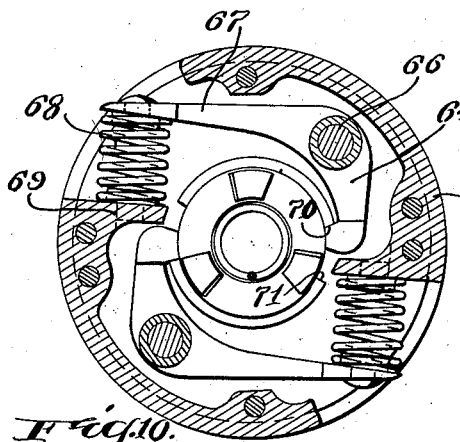
Figure 10 is still another view corresponding to Figure 7 showing the dogs or pawls as of the bell crank type actuated by helical springs.

Figure 10 shows the bell crank type of pawl at 64, the same being pivotally mounted within the clutch housing or casing 65 as in the previous instances, the pivots being indicated by reference character 66. These pawls or dogs 64 are of the bell crank type having tails 67 which are engaged by helical springs 68 which bear at their opposite ends against suitable abutments 69 on the inside of the housing or casing. These springs being compressed between the dog or pawl tail 67 and the abutment 69, tend to advance the pawl teeth 70 into engagement with the notches 71 in the hub of the clutch unit.

Figure 11:
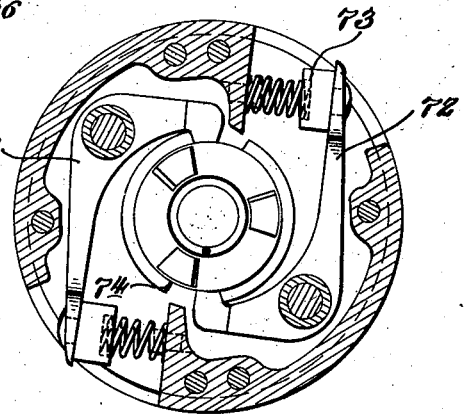
Figure 11 is still another figure corresponding to Figure 7, showing pawls or dogs of the bell crank type with the addition of counter weights.

Figure 11 is similar to the construction, Figure 10, except that the bell crank pawls 72 are provided with counter weights 73 which tend to assist the springs in holding the pawls in engagement with the notches 74 in the hub of the clutch unit, particularly during the operation of the tool when the parts are in rapid rotation. By variations of the weight the torque at which the pawls release can be determined and varied.

The structures shown in Figures 6, 7, 8, 9, 10 and 11 all include the normally released engaging means 40, 41 which is common in the art whereby the spindle 38 and the tool chuck are easily rotated to bring the tool or bit into engagement with the work. The pressure which is necessary to hold the bit in engagement with the work serves to establish a driving connection between the motor and the spindle.

When the nut, bolt or screw approaches its final position, the resistance is rapidly increased, until it reaches a point where the torque applied to the tool is sufficient to throw the pawls or dogs 46, 56, 64, 72, etc. out of engagement with the corresponding notches, the springs 48, 57, 68, etc. being overcome by the radial component of the force applied by the dogs or pawls to the shaft. The centrifugal pressure approximately balances. The spring, however, tends to return the pawls or dogs to engaged position. The momentum of the rotary parts accumulates during the period of release and when the pawls again encounter the notches, this accumulated momentum is transmitted to the work, this operation being repeated with a tangential hammering action until the desired set is reached and the operation of the tool discontinued.

By reversing the motor, this tangential hammering operation can be applied either in setting or in releasing, i. e., unsetting the nut, bolt or screw. An important advantage of the present invention inherent in all the structures described, is that this hammering operation can be performed without the harmful vibration of the tool which is incidental to the type of overload release in which the teeth are disposed in the direction of the axis and the releasing motion or passing of the teeth results in a vibration of the body of the tool in the direction of the axis. In the present device the pawls only are vibrated and they move in a radial direction.

In the normal functioning of the radially operating dog and pawl constructions previously described, in order to balance the structure and distribute the torque, two pawls have been shown carried by the clutch unit or casing and the shaft or hub is provided with a corresponding number of notches or seats so that the pawls necessarily engage once in each half revolution. To provide a further accumulation or building up of momentum without loss of balance and proper distribution of torque, I have devised a further modified structure illustrated in Figures 12, 13 and 14. In this construction also the clutch housing or unit 75 is provided with two pawls or dogs of the normally engaged type. These are indicated by reference character 76, 76'. These pawls are urged inwardly or forwardly to the normally engaged position by means of springs 77 of any suitable type. The pawls 76 and 76' cooperate with notches or depressions 78 and 79 in the collar or hub 80 which as shown is keyed or otherwise secured to the shaft or spindle 81 which is driven by the motor through a suitable train of gearing as previously described, the drive being preferably of the type more fully illustrated in Figure 15 to be more fully hereinafter described. The important feature of the structure shown in Figures 12, 13 and 14 is the arrangement whereby with a plurality of pawls or dogs and teeth giving a uniform distribution of the torque, there is but a single engagement of the pawls for each revolution. To this end the pawls 76 and 76' are offset in the direction of the axis throwing them out of alignment as to the path of rotation so that the two pawls or dogs move in parallel paths which are slightly spaced apart in the direction of the axis of the tool. The notches 78 and 79 with which the pawls cooperate are likewise placed out of alignment with each other, the notch 78 being in alignment with and in the path of the pawl 76 and the notch 79 being in alignment with and in the path of the pawl 76'. Under these circumstances the pawl 76' cooperates only with the notch 79, being caused to pass the notch 78 by the portion of metal at 82 which closes this notch 78 at the upper end of the hub 80 and the pawl 76 passes the notch 79, being held out of engagement by the portion of metal 82 which closes the notch 79 at its lower end. Thus, the overload release, while provided with two pawls or dogs and two cooperating notches, has but one position of engagement and is caused to engage but one during each complete revolution. This not only has the effect of increasing the accumulation or building up of momentum of the parts which is transferred to the work in the form of a tangential blow at each revolution of the tool instead of at each half revolution, but it reduces by half the whipping action of the pawls which in its most excessive occurrence has been found undesirable, and it also reduces to a very important extent the wear on the pawls and notches. The leaf spring type of pawl, Figures 7 and 9, and what may be termed the tailless type, Figures 3 and 5, are, however, not subject to this objection.

The elements of Figures 12, 13 and 14 are combined with the other elements of the tool as described in connection with the preceding figures.

Figure 16 shows an improved type of pawl or dog 92 in which the teeth may be formed of excessively hard metal, each tooth 93 consisting of a separate part having a shank 94 seated in and preferably extending through the corresponding end of the pawl. In the operation of the type of tool shown in Figures 12 to 16, the pawls being carried by the casing and the casing being driven by an internal annular gear 95, the rotation of the casing is transmitted to the shaft 90 by the pawls 76, 76' and/or 92 until released on account of an overload. The rotation of the shafts 81 and/or 90, is transmitted to spindle 86 by any suitable means shown at 83, 84. This device like that previously described as engaging means 40, 41, is normally released by a spring 89 permitting the spindle to be turned freely to bring it to proper annular relation with the work. When the bit carried by the spindle is brought into engagement with the work, suitable pressure applied to the tool causes the parts to connect in an operative manner as already described and the torque of the motor and rotating parts is applied to the work until the overload release operates on account of excess resistance. Thereafter, if the tool is held in working engagement, periodical release and reengagement of the parts takes place once in every revolution with the pawls 76, 76' or once in every half revolution of the pawls 92, the accumulated momentum of the rotating parts being thus applied to the work at corresponding intervals in the form of a series of tangential blows as previously outlined.

This operation of the various alternative forms of applicant's tool described has been fully disclosed in connection with the description. The important feature as already brought out is the avoidance of axial motion and vibration of the body of the tool in connection with the overload release.

I have thus described my invention and various forms and embodiments thereof, specifically and in detail in order that the manner of constructing, applying, operating and using the invention may be fully understood, however, the specific terms herein are used descriptively rather than in a limiting sense, the scope of the invention being defined in the claims.

What I claim as new and desire to secure by Letters Patent is:

1. The combination in a portable power driven manually controlled rotary tool having a source of power and a spindle with means for securing a socket wrench or screw driver thereto, to operate the same and means for transmitting rotary motion from said source to said spindle including an overload release with engaging means operable transversely to the axis of rotation of the spindle, and resilient means tending to hold said release in engaged position providing a definite positive driving connection up to a predetermined torque to be overcome and released when resistance at the tool equal to said torque is encountered, the spindle being mounted to slide in the direction of its axis, and a resilient member tending to advance the spindle in the direction of its axis and to be overcome by the pressure of the tool against the work, and releasing means operable by the motion of the spindle as it is advanced by said spring tending to release the spindle from said transmitting means so that the spindle remains stationary or may be rotated by hand to position for engagement with the work.

2. The combination in a portable power driven manually controlled rotary tool for running and setting nuts, driving and setting bolts, screws, etc. having a source of power and a spindle, and means for securing a socket wrench, screw driver or the like thereto, of an overload release comprising a plurality of dogs operable substantially in a radial plane and having resilient means holding them in engagement to drive the spindle subject to a predetermined torque and other means operable in the direction of the axis and connected to the spindle to be withdrawn by the pressure of the tool against the work for releasing said dogs and resilient means adapted to be overcome by the pressure of the tool against the work for advancing said releasing means, permitting the spindle to be freely rotated until working pressure is applied in the direction of the axis.

3. The combination in a portable power driven manually controlled rotary tool for running and setting nuts, driving and setting bolts, screws, etc. having a source of power, a spindle and means for securing a socket wrench, screw driver or the like thereto of an overload release comprising a dog operable substantially in a radial plane and having resilient means tending to hold it in engagement to drive the spindle subject to a predetermined torque, and other means operable in the direction of the axis to be withdrawn by the pressure of the tool against the work for holding said dogs normally released and resilient means adapted to be overcome by the pressure of the tool against the work, for advancing said releasing means permitting the spindle to be freely rotated until working pressure is applied in the direction of the axis withdrawing said releasing means when the dog is permitted to engage and hence to drive the spindle subject to release at the predetermined torque, said normal releasing means comprising a wedge shaped member which moves with the spindle and engages the teeth of the dog in the normal non-operative position of the spindle preventing driving engagement of the dog.

4. The combination in a portable power driven manually controlled rotary tool for running and setting nuts, driving and setting bolts, screws, etc., having a source of power, a spindle and means for securing a socket wrench, screw driver or the like thereto of an overload release comprising a dog having resilient means holding it in engagement to drive the spindle subject to a predetermined torque, and other means operable in the direction of the axis to be withdrawn by the pressure of the tool against the work for holding said dogs normally released, and resilient means adapted to be overcome by the pressure of the tool against the work, for advancing said releasing means permitting the spindle to be freely rotated until working pressure is applied in the direction of the axis withdrawing said releasing means when the dog is permitted to engage and hence to drive the spindle subject to release at the predetermined torque.

5. The combination in a portable power driven manually controlled rotary tool for running and setting nuts, driving and setting bolts, screws, etc., having a source of power, of a spindle mounted to slide in the direction of its length, means for securing a socket wrench, screw driver or the like thereto, an overload release comprising a dog and having resilient means holding it in engagement to drive the spindle subject to a predetermined torque, and other means operable in the direction of the axis and connected to the spindle to be withdrawn as the spindle slides backwardly due to the pressure of the tool against the work for holding the dogs normally released, and resilient means adapted to be overcome by the pressure of the tool against the work for advancing said spindle and releasing means to normal releasing position, permitting the spindle to be freely rotated until working pressure is applied in the direction of the axis, sliding the spindle backwardly and withdrawing said releasing means, when the dog is permitted to engage, and hence to drive the spindle subject to release at the predetermined torque, said releasing means comprising a wedge shaped member which engages the dog in the normal non-operative position of the spindle preventing driving engagement of the dog.

6. In a portable power driven manually controlled rotary tool for running and setting nuts and for driving and setting bolts and screws, the tool having a spindle with driving means and means for securing a screw driver or a socket wrench to the spindle, means connecting the spindle to the driving means including an overload release having a plurality of dogs operable transversely to the tool axis for connecting the rotary drive to the spindle to operate the same and means cooperating with the dogs to drive the spindle, the dogs being placed out of alignment one with the other in the direction of rotation and the cooperating means being likewise out of alignment in the direction of rotation, part of said cooperating means being aligned with one dog and part with another dog to provide selective engagement of the dogs with said cooperating means in certain predetermined relatively widely spaced positions only.

7. In a portable power driven manually controlled rotary tool for running and setting nuts and for driving and setting bolts and screws, the tool having a spindle and driving means, with means for securing a screw driver or a socket wrench thereto, means connecting the spindle to the driving means including an overload release having a plurality of dogs operable transversely to the tool axis, a plurality of means, one cooperating with each dog, respectively, to drive the spindle, the dogs being out of alignment one with the other in the direction of rotation and the cooperating means being likewise out of alignment one relatively to the other, one said cooperating means being aligned with one dog and another said cooperating means with another dog to provide for engagement of each dog with its particular cooperating means only and in certain predetermined positions only, said positions of engagement occurring once in each complete rotation of the tool.

8. In a portable power driven manually controlled rotary tool for running and setting nuts, for driving and setting bolts, screws and the like, the tool having a spindle with means for securing a screw driver or socket wrench or the equivalent thereto, a source of power and means connecting the spindle to the source of power including an overload release having a plurality of dogs operable transversely to the tool axis, means in the nature of a ratchet for cooperating with the dogs to drive the spindle, the spindle having means thereon for disengaging the pawls and being slidable in the direction of its length in response to pressure on the work to operate said means to release the pawls, the dogs consisting each of a lever pivoted at one end and having a tooth near the other end to engage the ratchet and a spring substantially in alignment with the tooth, tending to hold the tooth in engagement with the ratchet.

9. In a portable power driven manually controlled rotary tool for running and setting nuts, for driving and setting bolts, screws and the like, the tool having a spindle with means for securing a screw driver or socket wrench of the equivalent thereto, a source of power and means connecting the spindle to the source of power including an overload release having a plurality of dogs operable transversely to the tool axis, means in the nature of a ratchet for cooperating with the dogs to drive the spindle, each dog having a tooth to engage the ratchet and a spring tending to hold each tooth in engagement with the ratchet, an inclined seat for each spring on which the corresponding spring rests, means for holding each spring in engagement with its seat, and means secured to and carrying the seat and movable to change the tension of the spring by means of the incline which is disposed in the plane of rotation of said movement of the spring seats.

10. In a portable power driven manually controlled rotary tool for running and setting nuts, for driving and setting bolts, screws and the like, the tool having a spindle with means for securing a screw driver or socket wrench or the equivalent thereto, a source of power and means connecting the spindle to the source of power including an overload release having a plurality of dogs operable transversely to the tool axis, means in the nature of a ratchet for cooperating with the dogs to drive the spindle, each dog having a tooth to engage the ratchet and a spring tending to hold each tooth in engagement with the ratchet, and means for adjusting the tension of the springs, the spindle being mounted to slide, a spring for advancing the spindle which is overcome by pressure of the tool against the work in normal operation, and means releasing said connecting means as the spindle is advanced in response to the spring, in the absence of operating pressure of the tool against the work, permitting the tool to be freely rotated.

11. The combination in a portable power driven manually controlled tool for running nuts, driving and seating bolts, screws, etc., having a source of power and a spindle with means for securing a socket wrench or screw driver thereto, to operate the same and means for transmitting rotary motion from said source to said spindle including an overload release with engaging pawls operable in a plane transversely to the axis, and resilient means tending to hold said pawls in engaged position and means including a spring for holding the pawls normally in inoperative position, the spindle being mounted to slide and being connected to the holding means to withdraw the same permitting the engagement of the pawls when the tool is pressed against the work.

ALONZO G. DECKER.